(No Model.)
J. MARTIN.
FLOWER HOLDER.
No. 448,975. Patented Mar. 24, 1891.
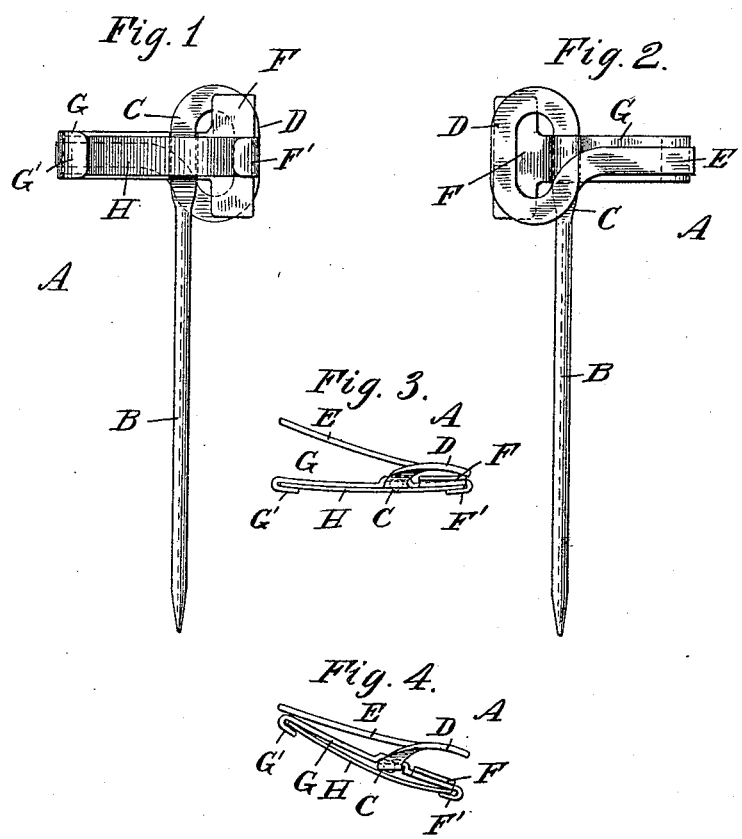
WITNESSES:
INVENTOR: J. Martin
BY
ATTORNEYS

United States Patent Office.

JAMES MARTIN, OF TEMESCAL, CALIFORNIA.

FLOWER-HOLDER.

SPECIFICATION forming part of Letters Patent No. 448,975, dated March 24, 1891.

Application filed June 17, 1890. Serial No. 355,716. (No model.)

*To all whom it may concern:*

Be it known that I, JAMES MARTIN, of Temescal, in the county of Alameda and State of California, have invented a new and Improved Flower-Holder, of which the following is a full, clear, and exact description.

The object of the invention is to provide a new and improved flower-holder, which is simple and durable in construction and specially designed for conveniently and securely holding flowers in place when constructing floral designs of all descriptions.

The invention consists in certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a rear side elevation of the same. Fig. 3 is a plan view of the improvement closed, and Fig. 4 is a like view of the same open.

The improved flower-holder A is provided with a shank B, pointed at its lower end, so as to be conveniently stuck into suitable material on which the floral design is to be constructed. The upper end of the shank B is provided with the flattened part C, from which extends a bent part forming a jaw D, which terminates in an arm or handle E, extending at right angles to the shank B and at the opposite side of the shank to that on which the jaw D is located. The jaw D is made in about the shape of the letter C, the upper end of which is fastened to the flattened part C, the lower end terminating in the arm E previously mentioned. Opposite this jaw D is arranged a jaw F, having an arm G, extending in line with the arm E in the rear of the flattened part C, and on the ends of this jaw F and the arm G are formed clips or flanges F' and G', respectively, supporting a spring H, which passes over the front of the flattened part C, thus holding the arm G with its jaw F in place.

When the device is in its normal position, as illustrated in Fig. 3, the jaws D and F are closed; but when the operator desires to secure a flower-stem on the holder the operator presses on the outer ends of the arms E and G, so that the jaws D and F move from each other so as to open to permit the insertion of flower-stem. As soon as the operator releases his pressure on the arms E and G the jaws D and F close onto the flower-stem, thus holding the latter with the flower in place. The shank B is then stuck into the frame supporting the floral design, so that the flower is held in the proper place.

It will be seen that when the operator presses on the outer ends of the arms E and G, as previously described, the arm G swings on the flattened part C of the shank D as a fulcrum, so that one side of the flattened part presses against the spring H, as is plainly shown in Fig. 4, whereby the latter is compressed, and as soon as the operator releases the pressure on the arms E and G the spring H forces the arm G to its normal position, thus closing the jaws.

Having thus described my invention, what I claim as new, and desire to secure by Letters Patent, is—

1. The herein-described flower-holder, comprising the shank or pin having its upper end curved outward and downward to form a jaw and thence laterally across the shank and forming an arm, and a spring-pressed clamping-jaw opposite the first-named jaw and having an arm crossing and rocking on the shank behind the first-named jaw, substantially as set forth.

2. In a flower-holder, the combination, with a shank provided with a flattened part continuing into a jaw having an arm, of a second jaw arranged opposite the first jaw and provided with an arm extending in line with the first-named arm, and a spring held on the said second jaw and arm and passing over the flattened end of the shank, substantially as shown and described.

3. In a flower-holder, the combination, with a shank provided with a flattened part continuing into a jaw having an arm, of a second jaw arranged opposite the first jaw and provided with an arm extending in line with the first-named arm, a spring held on the said second jaw and arm and passing over the flattened end of the shank, and flanges held on the said second jaw and its arm to retain the spring in place, substantially as shown and described.

JAMES MARTIN.

Witnesses:
W. COLIN,
WILL N. BURRALL.